(12) United States Patent
Pitchford et al.

(10) Patent No.: US 6,178,457 B1
(45) Date of Patent: Jan. 23, 2001

(54) METHOD AND SYSTEM FOR CONTROLLING AND TRACKING CLIENT ACCESS TO SERVER SOFTWARE

(75) Inventors: Anthony Reginald Pitchford, Mission Viejo; Christopher Eyre Smith, Coto de Caza; Joseph Peter Stefaniak, San Clemente, all of CA (US)

(73) Assignee: Unisys Corporation, Blue Bell, PA (US)

( * ) Notice: Under 35 U.S.C. 154(b), the term of this patent shall be extended for 0 days.

(21) Appl. No.: 09/156,027

(22) Filed: Sep. 17, 1998

(51) Int. Cl.$^7$ .................................................. G06F 15/16
(52) U.S. Cl. ........................................... 709/228; 709/227
(58) Field of Search ................................... 709/227, 228, 709/229, 225, 224, 223, 203; 707/10, 9, 2, 103, 104

(56) References Cited

U.S. PATENT DOCUMENTS

| | | | |
|---|---|---|---|
| 5,835,724 | * 10/1998 | Smith | 709/227 |
| 5,884,312 | * 3/1999 | Dustan et al. | 707/10 |
| 5,892,917 | * 4/1999 | Myerson | 709/224 |
| 5,968,119 | * 10/1999 | Stedman et al. | 709/219 |
| 5,974,443 | * 10/1999 | Teske | 709/202 |
| 6,018,619 | * 1/2000 | Allard et al. | 709/224 |
| 6,065,120 | * 5/2000 | Laursen et al. | 713/201 |

* cited by examiner

*Primary Examiner*—Mehmet B. Geckil
(74) *Attorney, Agent, or Firm*—J. Ronald Richebourg; Mark T. Starr; Rocco L. Adornato

(57) ABSTRACT

In a client-server computing system, where the server includes a storage device, a method is disclosed which is executed by the system for controlling and tracking client access to server software being executed by the system. The method includes initiating a first call from one or more clients to the server and instantiating a server component within a server application for each client call. The server components instantiate engine components, which log onto the storage device for assignment of session ID's. The session ID's are returned to the engine components and passed back to the server components and entered and attached to a shared persistent resource, thereafter breaking the link between each server component and each engine component. The session ID's are passed back to the respective client components for reference when a next call to the server is to be made and the link between each server component and each client component is broken. When a subsequent call is initiated from a client to the server, which includes a session ID, another server component is instantiated within the server application. The shared persistent resource is accessed and a request is made for the reference to the corresponding engine component, which provides access to the storage device and allows the server component to complete any work requested by the client. On completion of the work requested by each client, the link between the client and the server is broken.

14 Claims, 4 Drawing Sheets

METHOD AND SYSTEM FOR CONTROLLING AND TRACKING CLIENT ACCESS TO SERVER SOFTWARE

CROSS REFERENCE TO RELATED APPLICATIONS

This patent document relates to the following co-pending applications, assigned to the same assignee hereof, which are incorporated herein by reference.

U.S. Ser. No. 09/154,613, entitled A METHOD AND SYSTEM FOR MONITORING AND CAPTURING ALL FILE USAGE OF A SOFTWARE TOOL;

U.S. Ser. No. 09/156,029, entitled A METHOD AND SYSTEM FOR INTERFACING TO A VARIETY OF SOFTWARE DEVELOPMENT TOOLS;

U.S. Ser. No. 09/156,028, entitled A SOFTWARE SYSTEM DEVELOPMENT FRAMEWORK; and, U.S. Ser. No. 09/156,026, entitled A METHOD AND SYSTEM FOR BUILDING COMPONENTS IN A FRAMEWORK USEFUL IN DEVELOPING INTEGRATED BUSINESS-CENTRIC APPLICATIONS.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of computer systems for developing business applications; and, in particular, it relates to a method for controlling and tracking client access to server software being executed by the computer system.

BACKGROUND OF THE INVENTION

In the field of client/server computing systems, some server software may not be multi-threaded. In such cases the server software does not allow another process to make multiple simultaneous calls to it. This is a limitation of single-threaded client/server software. Hence, remote clients need their own connection into the server software, with either a disproportionate amount of the work being done on the client, or wasteful duplication of processes being executed on the server.

The problem is compounded when the server software is session-oriented, that is, the work currently being performed depends upon the history of the previous work done. This requires not only that the server software service all the clients simultaneously, but it must also know exactly what has been done by each client.

A more difficult problem is that clients are continuously making requests to the server and each request is disjoint from that server's point of view.

SUMMARY OF THE INVENTION

Accordingly, it is an object of the present invention to provide access to a server through a unique process that provides a component instantiated for each active client in its own process space, thereby circumventing the multi-threading restriction of the server software.

Another object of the present invention is to provide a method in a server process for storing a persistent collection of data pairs to overcome the problem of disjointed requests on the server by the clients.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
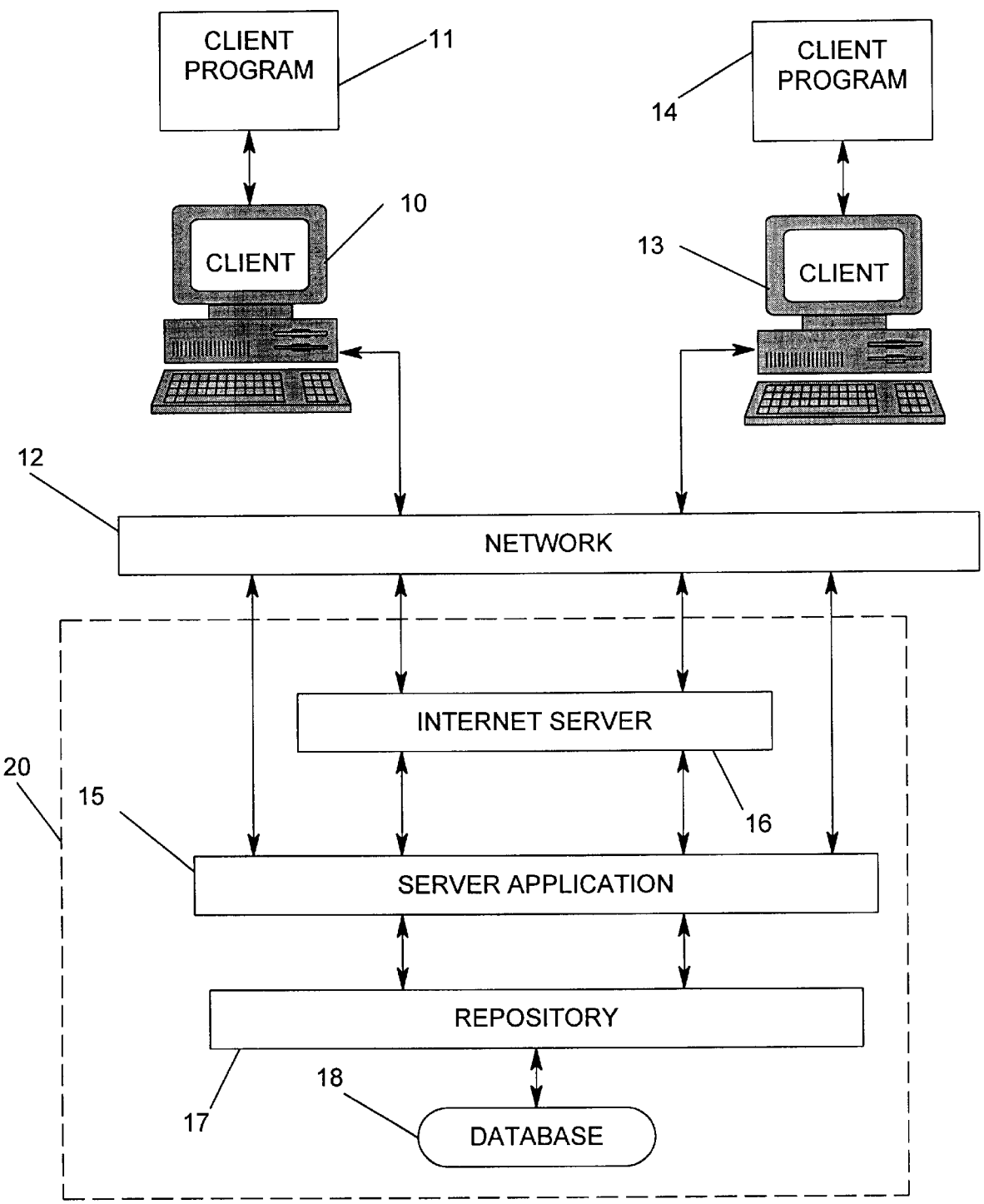
FIG. 1 is a block diagram of a computer system framework that may employ the method and system of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc.

The term schema as used herein refers to the logical description of data in a database, including definitions and relationships of data.

As alluded to hereinabove, while the server is executing a first method, a second method residing on one of the clients or on the server cannot make multiple simultaneous processing requests to the first method. The solution provided by the present invention is the provision of a second method on the client or the server that allows the making of multiple simultaneous processing requests to the first method.

This solution solves the problem by allowing processing to occur on the server, without a heavy penalty for duplication. It fits very conveniently into the currently popular web-based and transaction processing architectures, having a thin client with a supporting web server and transaction server software on the server.

Moreover, the solution allows all the client components to funnel through a connection protocol (e.g. HTTP or DCOM) into a single server method. This method can manage secure transactions and process business logic on the server. The solution provides a means for allowing the many client requests being processed by the server process for accessing the non-multithreaded piece of software simultaneously.

When a new client becomes active, it requests to start a session on the server software. At this time, an engine object is instantiated on its behalf by a component in the server software. The Engine object then initiates a session in the server software and returns a session ID to the component. The component then returns the session ID to the client and also creates a pair of data items: the session ID and a reference to the Engine object that has just been created.

The client stores its session ID, and every time it needs to make a request to the server, it includes the session ID with a request. When the server receives the request, it invokes the component that accesses the persistent store. In return for the session ID, the persistent store returns the reference to the appropriate Engine object. From the Engine object, the requests to the server software can be issued.

Accordingly, an arbitrary number of clients can appear to have simultaneous access to the server software, with a minimum amount of processing being required on the client (for example, only a web browser) and a minimum amount of process duplication on the server. The session integrity of each client is maintained. This solution provides an efficient and highly scaleable solution to the problem.

Referring now to the drawings, and FIG. 1 in particular, a client 10 executing a client program 11 is coupled to a network 12. Another client 13 executing a client program 14 is also coupled to the network 12. The network 12 is coupled directly to a server application 15, such as the Microsoft Transaction Server available from Microsoft Corporation of Redmond, Wash., or it may be coupled through an internet server 16. The server application 15 is coupled to a repository 17. It is pointed out that other readily available server applications may be used in lieu of the Microsoft Transaction Server.

In the disclosed embodiment, the repository 17 is a specialized, extensible object-oriented database application that adds value to a database system, which allows customization of a particular domain (such as application development). The repository 17 is coupled to a database 18 for accessing modeling data stored therein.

The repository 17 further includes tools for cataloging, browsing, and managing components that make up an application. Methods to support these services are disclosed in several patents and patent applications assigned to the assignee of this application, including U.S. Pat. No. 5,671, 398 for METHOD FOR COLLAPSING A VERSION TREE WHICH DEPICTS A HISTORY OF SYSTEM DATA AND PROCESSES FOR AN ENTERPRISE; U.S. Pat. No. 5,644, 764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848, 273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; U.S. Pat. No. 6,105,073 for A METHOD FOR PACKING/ UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
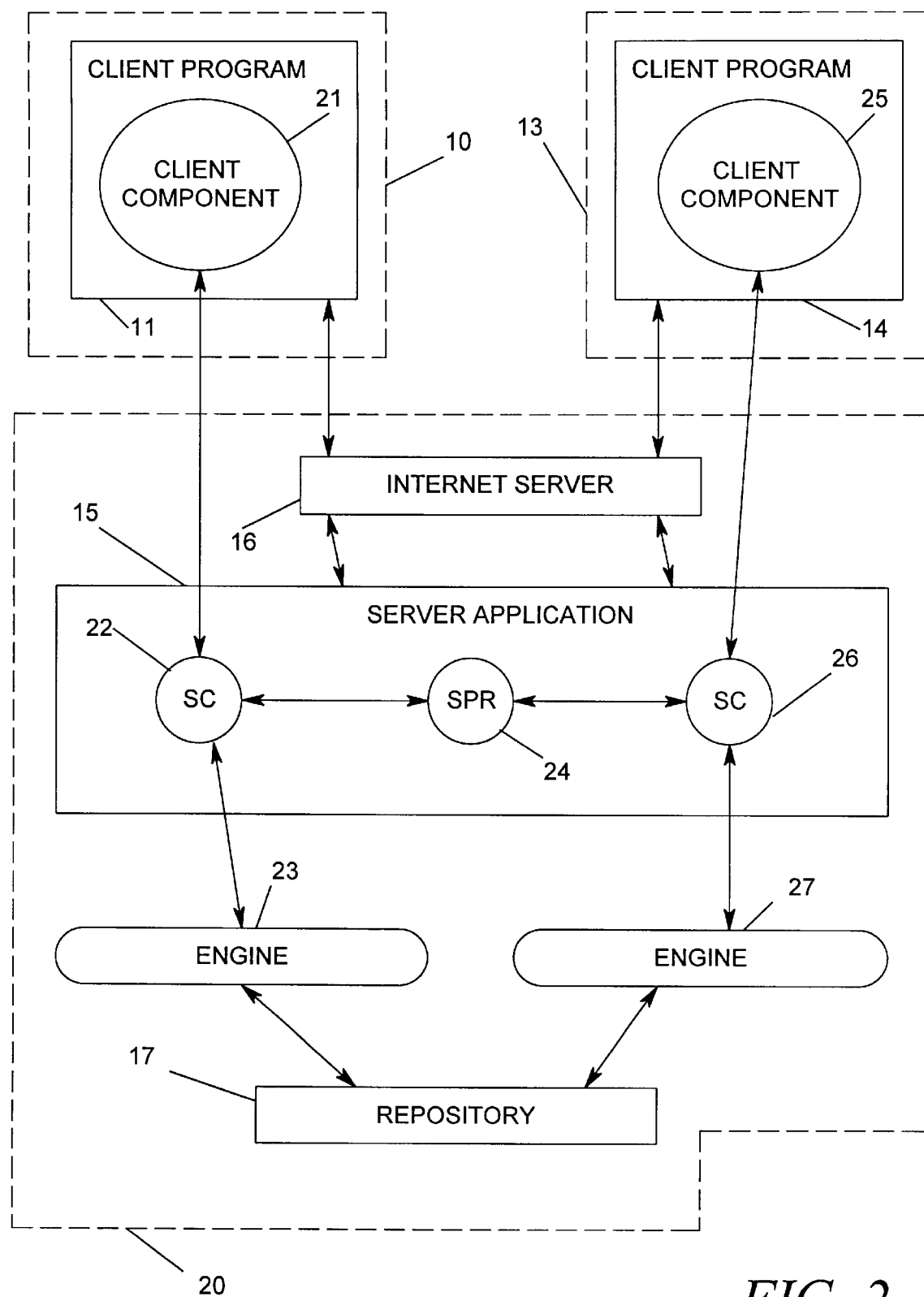
FIG. 2 is a software module block diagram of the method and system of the present invention.

Referring now to FIG. 2, a software module block diagram of the method and system of the present invention is shown. A client component 21, within the client program 11 (being executed by the client 10) initiates a call to the server 20 whereupon a server component ("SC") 22 is instantiated within the server application 15. The server component 22 instantiates an Engine component 23, which logs onto the repository 17 for assignment of a session ID. When the session ID is returned from the engine component 23, an entry is created by attaching to a Shared Persistent Resource ("SPR") 24. The session ID is passed back to the server component 22, whereupon the link between the components 22 and 23 is broken. Next, the session ID is passed back to the client component 21 for reference when the next call to the server is made and the link between the components 21 and 22 is broken.

In a similar manner, a client component 25 initiates a call to the server 20 and a server component 26 is instantiated within the same server application 15. An engine component 27 is instantiated, and a log-on to the repository 17 occurs. The repository 17 assigns a session ID, which is returned to the server component 26 and the link between the components 26 and 27 is broken. The SPR 24 is then attached to the component 26. Next, the session ID is passed back to the client component 25 for future reference and the link between the components 25 and 26 is broken. The Engine components 23 and 27 are instantiated in their own processes, thereby circumventing the multi-threading restriction of the server software (e.g., the repository 17). All accesses to the server software are made by this process.

Figure 3A:
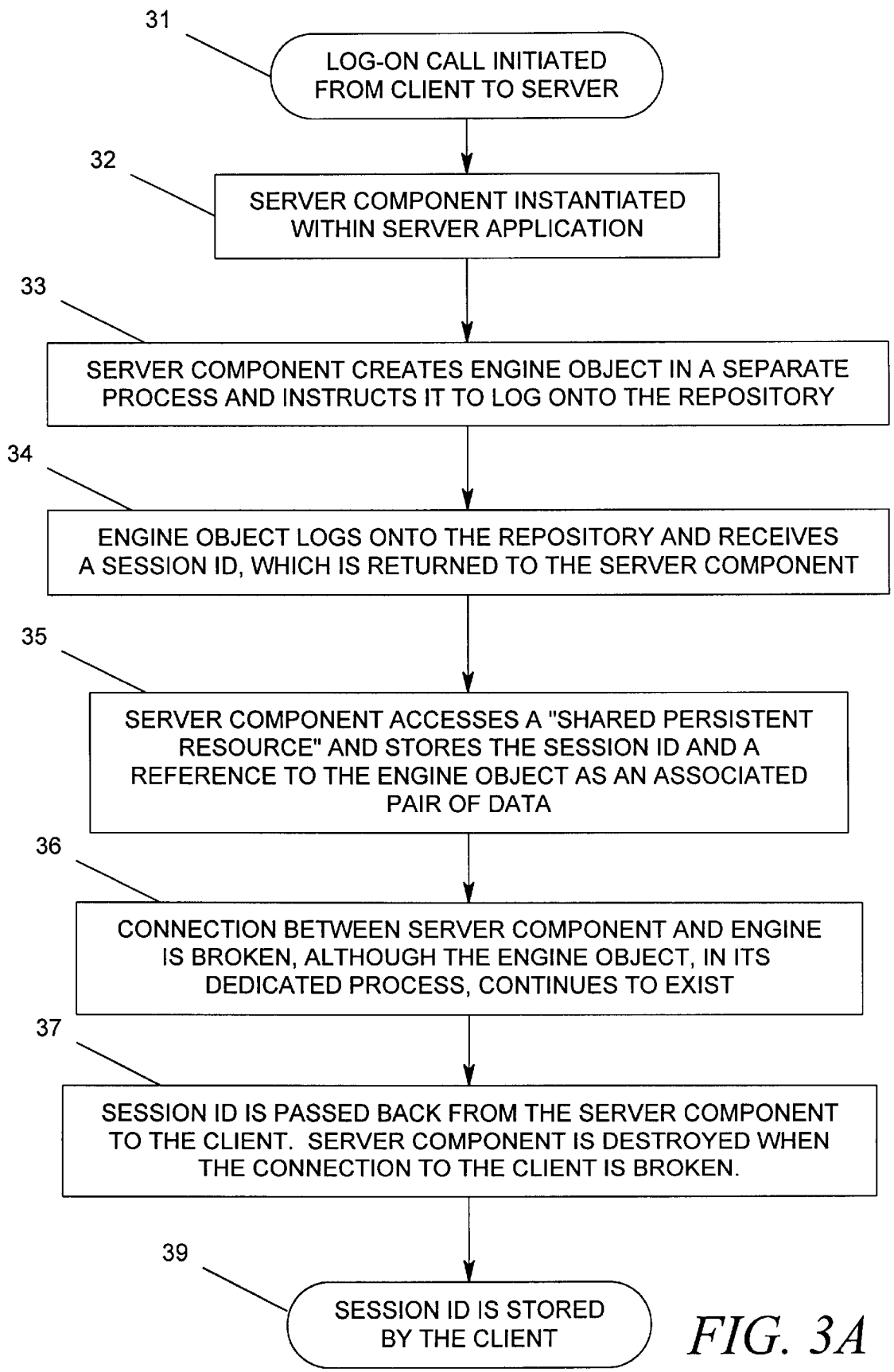
FIGS. 3A and 3B combined form a flow chart of the process of the present invention.
Figure 3B:
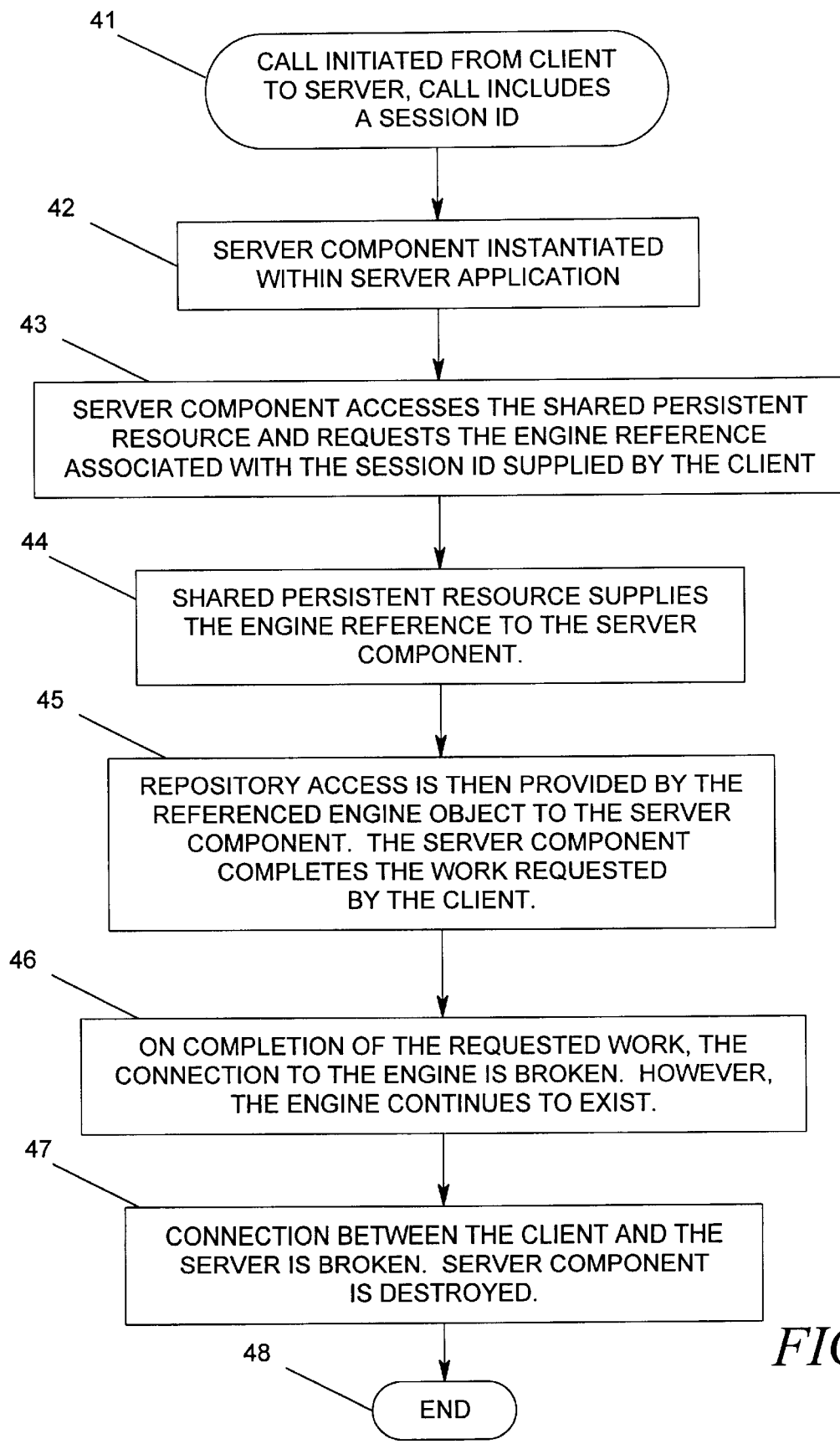

For a more detailed description of the steps of the process of the present invention, reference is made to the flow charts in FIGS. 3A and 3B. Beginning with FIG. 3A, a Log-On Call is initiated from the client to the server (bubble 31). In response to this, a server component is instantiated within the server (block 32), such as SC 22. Next, the server component creates an Engine object (such as object 23) in a separate process and instructs it to log onto the repository 17 (block 33). The Engine object logs onto the repository 17 and in return receives a session ID, which is returned to the server component (block 34). The server component then accesses a Shared Persistent Resource (such as SPR 24), which stores the session ID and a reference to the Engine object as an associated pair of data (block 35).

Following the above, the connection between the server component and the Engine is broken. However, the Engine object, in its dedicated process, continues to exist (block 36). The session ID is then passed back from the server component to the client. The server component is destroyed when the connection to the client is broken (block 37). The session ID is stored by the client for use when making another call from the client to the server (bubble 39).

Referring now to FIG. 3B, a call is initiated from the client to the server, which call includes the previously stored session ID (bubble 41). In response to this a server component is again instantiated within the server application 15 (block 42). The server component then accesses the Shared Persistent Resource and requests the Engine reference associated with the session ID supplied by the client (block 43). Next, the Shared Persistent Resource supplies the Engine reference to the server component (block 44). The Engine reference object to the server component then provides access to the repository 17. The server component then completes the work requested by the client (block 45).

On completion of the work requested by the client, the connection to the Engine is broken. However, the Engine continues to exist (block 46). After this, the connection between the client and the server is broken and the server component is destroyed (block 47). The call to the server from the client ends (bubble 48).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a client-server computing system, said server having a storage device, a method being executed by said system for controlling and tracking client access to server software being executed by said computing system, said method comprising the steps of:

a. initiating a first call from said client to said server;
   b. instantiating a server component within a server application;
   c. said server component instantiating an engine component, which logs onto said storage device for assignment of a session ID;
   d. returning said session ID to said engine component;
   e. passing said session ID back to said server component and entering and attaching to a shared persistent resource, thereafter breaking the link between said server component and said engine component; and,
   f. passing said session ID back to said client component for reference when a next call to said server is to be made and breaking the link between said server component and said client component.

2. The method as in claim 1 wherein a subsequent call is initiated from said client to said server that includes said session ID, further comprising the steps of:

a. instantiating a second server component within said server application;
   b. accessing said shared persistent resource and requesting reference to said engine component;
   c. said engine component providing access to said storage device, which allows said server component to complete any work requested by said client; and d. on completion of the work requested in the preceding step, breaking the link between said client and said server.

3. In a client-server computing system having a multiplicity of clients coupled to said server, said server having a storage device, a method being executed by said system for controlling and tracking client access to server software being executed by said computing system, said method comprising the steps of:
   a. initiating a first call to said server from a first client component within a first one of said clients;
   b. instantiating a first server component within a server application;
   c. said first server component instantiating a first engine component, which logs onto said storage device for assignment of a first session ID;
   d. returning said first session ID to said first engine component;
   e. passing said first session ID back to said first server component and entering and attaching to a shared persistent resource, thereafter breaking the link between said first server component and said first engine component;
   f. passing said first session ID back to said first client component for reference when a next call to said server is to be made and breaking the link between said first server component and said first client component;
   g. initiating a second call to said server from a second client component within a second one of said clients;
   h. instantiating a second server component within said server application;
   i. said second server component instantiating a second engine component, which logs onto said storage device for assignment of a second session ID;
   j. returning said second session ID to said second engine component;
   k. passing said second session ID back to said second server component and entering and attaching to said shared persistent resource, thereafter breaking the link between said second server component and said second engine component; and,
   l. passing said second session ID back to said second client component for reference when a next call to said server is to be made and breaking the link between said second server component and said second client component.

4. The method as in claim 3 when a subsequent call is initiated from said first client to said server including said first session ID, further comprising the steps of:
   a. instantiating a third server component within said server application;
   b. accessing said shared persistent resource and requesting reference to said first engine component;
   c. said first engine component providing access to said storage device, which allows said second server component to complete any work requested by said first client; and
   d. on completion of the work requested in the preceding step, breaking the link between said first client and said server.

5. The method as in claim 4 when a subsequent call is initiated from said second client to said server including said second session ID further comprising the steps of:
   a. instantiating a third server component within said server application;
   b. accessing said shared persistent resource and requesting reference to said second engine component;
   c. said second engine component providing access to said storage device, which allows said second server component to complete any work requested by said second client; and
   d. on completion of the work requested in the preceding step, breaking the link between said second client and said server.

6. The method as in claim 3 wherein said shared persistent resource is a single entity serving all server applications present in said client-server computing system.

7. The method as in claim 3 wherein said storage device is a repository.

8. The method as in claim 3 wherein said shared persistent resource is a collection of multiple entities serving all server applications present in said client-server computing system.

9. A program storage medium readable by a client-server computing system having a multiplicity of clients coupled to said server, said server having a storage device, said storage medium tangibly embodying a program of instructions executable by said system to perform method steps for controlling and tracking client access to server software being executed by said computing system, said method comprising the steps of:
   a. initiating a first call to said server from a first client component within a first one of said clients;
   b. instantiating a first server component within a server application;
   c. said first server component instantiating a first engine component, which logs onto said storage device for assignment of a first session ID;
   d. returning said first session ID to said first engine component;
   e. passing said first session ID back to said first server component and entering and attaching to a shared persistent resource, thereafter breaking the link between said first server component and said first engine component;
   f. passing said first session ID back to said first client component for reference when a next call to said server is to be made and breaking the link between said first server component and said first client component;
   g. initiating a second call to said server from a second client component within a second one of said clients;
   h. instantiating a second server component within said server application;
   i. said second server component instantiating a second engine component, which logs onto said storage device for assignment of a second session ID;
   j. returning said second session ID to said second engine component;
   k. passing said second session ID back to said second server component and entering and attaching to said shared persistent resource, thereafter breaking the link between said second server component and said second engine component; and,
   l. passing said second session ID back to said second client component for reference when a next call to said server is to be made and breaking the link between said second server component and said second client component.

10. The medium as in claim 9 when a subsequent call is initiated from said first client to said server including said first session ID, said method further comprising the steps of:
  a. instantiating a third server component within said server application;
  b. accessing said shared persistent resource and requesting reference to said first engine component;
  c. said first engine component providing access to said storage device, which allows said second server component to complete any work requested by said first client; and
  d. on completion of the work requested in the preceding step, breaking the link between said first client and said server.

11. The medium as in claim 10 when a subsequent call is initiated from said second client to said server including said second session ID, said method further comprising the steps of:
  a. instantiating a third server component within said server application;
  b. accessing said shared persistent resource and requesting reference to said second engine component;
  c. said second engine component providing access to said storage device, which allows said second server component to complete any work requested by said second client; and
  d. on completion of the work requested in the preceding step, breaking the link between said second client and said server.

12. The medium as in claim 9 wherein said shared persistent resource is a single entity serving all server applications present in said client-server computing system.

13. The medium as in claim 9 wherein said storage device is a repository.

14. The medium as in claim 9 wherein said shared persistent resource is a collection of multiple entities serving all server applications present in said client-server computing system.

* * * * *